(12) United States Patent
Angadjivand et al.

(10) Patent No.: US 10,130,833 B2
(45) Date of Patent: Nov. 20, 2018

(54) REINFORCED FILTER MEDIA

(75) Inventors: Seyed A. Angadjivand, Woodbury, MN (US); Marvin E. Jones, Grant, MN (US); Philip G. Martin, Forest Lake, MN (US); John M. Brandner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 551 days.

(21) Appl. No.: 13/508,470

(22) PCT Filed: Nov. 12, 2010

(86) PCT No.: PCT/US2010/056479
§ 371 (c)(1),
(2), (4) Date: May 7, 2012

(87) PCT Pub. No.: WO2011/062843
PCT Pub. Date: May 26, 2011

(65) Prior Publication Data
US 2012/0222679 A1 Sep. 6, 2012

Related U.S. Application Data

(60) Provisional application No. 61/262,284, filed on Nov. 18, 2009.

(51) Int. Cl.
*A62B 23/00* (2006.01)
*A61M 16/06* (2006.01)
(Continued)

(52) U.S. Cl.
CPC .......... *A62B 23/025* (2013.01); *B01D 39/083* (2013.01); *B01D 39/1623* (2013.01);
(Continued)

(58) Field of Classification Search
CPC .......................... A41D 13/11; A41D 13/1184; A41D 13/1107; A41D 13/1115; A41D 13/1123;
(Continued)

(56) References Cited

U.S. PATENT DOCUMENTS 3,971,373 A 7/1976 Braun
4,004,584 A 1/1977 Geaney
(Continued)

FOREIGN PATENT DOCUMENTS

EP 0032422 7/1981
EP 0789101 8/1997
(Continued)

OTHER PUBLICATIONS

Davies "The Separation of Airborne Dust and Particles," Institution of Mechanical Engineers, London, Proceedings 1B, 1952, pp. 185-194.
(Continued)

*Primary Examiner* — Gregory Anderson
*Assistant Examiner* — Ned T Heffner
(74) *Attorney, Agent, or Firm* — Jeffrey M. Olofson

(57) ABSTRACT

Reinforced filter media are prepared by adhering discrete, non-intersecting strands of thermoplastic or thermoset materials to the filter media web. The filter media may be a fabric, a nonwoven web or a filtering foam. The reinforced filter media can be used to prepare respirators, including flat-fold respirators or molded respirators.

7 Claims, 3 Drawing Sheets

(51) Int. Cl.
  *A62B 23/02* (2006.01)
  *B01D 39/08* (2006.01)
  *B01D 39/16* (2006.01)
  *A41D 13/11* (2006.01)

(52) U.S. Cl.
  CPC ...... *A41D 13/1107* (2013.01); *A41D 13/1146* (2013.01); *B01D 2239/0654* (2013.01); *B01D 2239/0681* (2013.01)

(58) Field of Classification Search
  CPC ....... A41D 13/113; A62B 17/04; A62B 23/06; A62B 23/025; A62B 18/025; A62B 23/02; A61M 16/06; Y10T 442/30; Y10T 442/643; Y10T 442/637; Y10T 442/641; D04H 3/147; B32B 5/26; B32B 5/12; B01D 39/00; B01D 39/0216; B01D 2239/0622; B01D 2239/0627
  USPC .......................... 128/205.12, 201.25–201.28, 128/205.27–205.29, 206.12, 206.13, 128/206.14–206.18, 206.19, 206.21, 128/206.27, 206.28, 863; 442/199, 381; 428/105–114
  See application file for complete search history.

(56) References Cited

U.S. PATENT DOCUMENTS

| | | | |
|---|---|---|---|
| 4,100,324 A | 7/1978 | Anderson | |
| 4,118,531 A | 10/1978 | Hauser | |
| 4,215,682 A | 8/1980 | Kubik | |
| 4,300,549 A | 11/1981 | Parker | |
| 4,375,718 A | 3/1983 | Wadsworth | |
| RE31,285 E | 6/1983 | van Turnhout | |
| 4,429,001 A | 1/1984 | Kolpin | |
| 4,454,881 A | 6/1984 | Huber | |
| 4,473,071 A * | 9/1984 | Hunt | A62B 18/00 128/201.13 |
| 4,588,537 A | 5/1986 | Klaase | |
| 4,592,815 A | 6/1986 | Nakao | |
| 4,628,927 A | 12/1986 | Ward | |
| 4,631,215 A * | 12/1986 | Welygan et al. | 428/105 |
| 4,840,847 A * | 6/1989 | Ohmae et al. | 428/373 |
| 4,850,347 A | 7/1989 | Skov | |
| 4,873,972 A | 10/1989 | Magidson | |
| 4,920,960 A * | 5/1990 | Hubbard et al. | 128/206.12 |
| 5,496,507 A | 3/1996 | Angadjivand | |
| 5,701,893 A | 12/1997 | Kern | |
| 5,736,041 A | 4/1998 | Skov | |
| 5,811,186 A | 9/1998 | Martin | |
| 6,017,411 A | 1/2000 | Schultink | |
| 6,123,077 A | 9/2000 | Bostock | |
| 6,390,090 B1 | 5/2002 | Piper | |
| 6,394,090 B1 | 5/2002 | Chen | |
| 6,403,197 B1 | 6/2002 | Skov | |
| 6,571,797 B1 | 6/2003 | Magidson | |
| 6,827,764 B2 | 12/2004 | Springett | |
| 6,923,182 B2 | 8/2005 | Angadjivand | |
| 7,052,565 B2 | 5/2006 | Seth | |
| 7,069,930 B2 | 7/2006 | Bostock | |
| 2002/0137418 A1 | 9/2002 | Seth | |
| 2004/0011362 A1 | 1/2004 | Angadjivand | |
| 2004/0143942 A1 | 7/2004 | Seth | |
| 2004/0255946 A1 | 12/2004 | Gerson | |
| 2005/0139218 A1 | 6/2005 | Bostock | |
| 2006/0005838 A1 | 1/2006 | Magidson | |
| 2006/0102183 A1 | 5/2006 | Skov | |
| 2007/0068529 A1 * | 3/2007 | Kalatoor | A62B 23/025 128/206.19 |
| 2007/0157932 A1 * | 7/2007 | Cerbini | A41D 13/1138 128/205.27 |
| 2008/0011303 A1 | 1/2008 | Angadjivand | |
| 2008/0026172 A1 | 1/2008 | Stelter | |
| 2008/0026659 A1 | 1/2008 | Brandner | |
| 2008/0271737 A1 | 11/2008 | Facer | |
| 2008/0271739 A1 | 11/2008 | Facer | |
| 2008/0318014 A1 | 12/2008 | Angadjivand | |
| 2009/0078261 A1 | 3/2009 | Martin | |
| 2009/0078265 A1 * | 3/2009 | Gebrewold et al. | 128/206.19 |
| 2009/0090364 A1 | 4/2009 | Daugaard | |

FOREIGN PATENT DOCUMENTS

| | | |
|---|---|---|
| EP | 1147787 | 10/2001 |
| EP | 1614361 | 1/2006 |
| EP | 1773144 | 4/2007 |
| JP | 06155046 | 6/1996 |
| JP | 08155046 | 6/1996 |
| WO | WO 1993-21788 | 11/1993 |
| WO | WO 1996-28216 | 9/1996 |
| WO | WO 2000-53830 | 9/2000 |
| WO | WO 2006-019472 | 2/2006 |
| WO | WO 2006-065656 | 6/2006 |

OTHER PUBLICATIONS

Wente, "Superfine Thermoplastic Fibers", Industrial Engineering Chemistry, Aug. 1956, vol. 48, No. 8, pp. 1342-1346.

Wente, "Manufacture of Super Fine Organic Fibers", Naval Research Laboratories, Report No. 4364, May, 25, 1954, 22 pages.

International Search Report for PCT International Application No. PCT/US2010/056479, dated Jul. 19, 2011, 4 pages.

* cited by examiner

REINFORCED FILTER MEDIA

CROSS REFERENCE TO RELATED APPLICATIONS

This application is a national stage filing under 35 U.S.C. 371 of PCT/US2010/056479, filed Nov. 12, 2010, which claims priority to U.S. Provisional Application No. 61/262,284, filed Nov. 18, 2009, the disclosure of which is incorporated by reference in its/their entirety herein.

FIELD OF THE DISCLOSURE

This disclosure relates to filter media, especially filter media that can be used to prepare respirators.

BACKGROUND

Filter media are materials, often webs, such as fibrous webs, that are suitable for air filtration. Filter media are useful in a variety of applications including in the formation of personal respirators. Personal respirators are commonly used to protect a wearer from inhaling particles suspended in the air or from breathing unpleasant or noxious gases. Respirators generally come in one of two types: a flat-folded form or a shaped form. The flat-folded masks are generally packed flat, but are formed with seams, pleats, and/or folds that enable them to be opened into a cup-shaped configuration that fits a wearer's face. The flat-folded form has the advantages that it can be carried in a wearer's pocket until needed, unfolded for use, and re-folded flat for storage. The shaped form of personal respirator is generally a molded cup-shaped form. In contrast to the flat-folded form, the cup-shaped form is more-or-less permanently formed into a face-fitting configuration and generally retains that configuration during use.

SUMMARY

Respirators containing reinforced filter media, methods of preparing reinforced filter media, and methods of preparing respirators are disclosed.

In some embodiments, the respirators comprise a reinforced filter media, the reinforced filer media comprising a polymeric web, and discrete, non-intersecting strands of reinforcing material attached to the web.

Methods of making filter media are also disclosed. In some embodiments, the methods comprise providing a polymeric web, and contacting discrete, non-intersecting strands of reinforcing material to at least one surface of the web, wherein the strands of reinforcing material adhere to the polymeric web.

Methods of preparing respirators are also disclosed. In some embodiments, the methods comprise providing a reinforced filter media, wherein the reinforced filter media comprises a polymeric web and discrete, non-intersecting strands of reinforcing material attached to the web; and forming a respirator. In some embodiments, the forming step comprises cutting the reinforced filter media into a shaped pre-form, and sealing the pre-form to form a flat-fold respirator. In other embodiments, the forming step comprises molding the media to form a cup-shaped respirator.

In some embodiments, the method of preparing a respirator comprises providing a filter media web, preparing a reinforced polymeric web, the reinforced polymeric web comprising a fabric, a nonwoven web, or filtering foam and discrete, non-intersecting strands of reinforcing material attached to the polymeric web, layering together the filter media web and the reinforced polymeric web, and forming a respirator.

DETAILED DESCRIPTION

Figure 1:
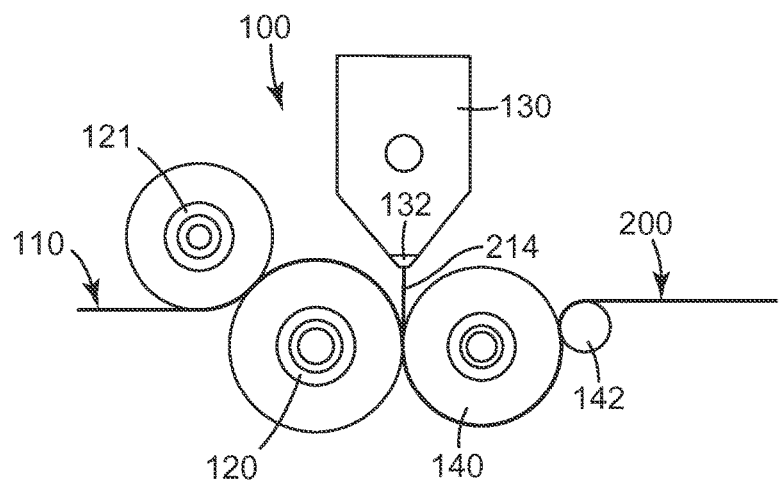
FIG. 1 is a diagrammatic view illustrating one exemplary apparatus in accordance with the present disclosure.

Reinforced filter media which comprise a polymeric web with strands of reinforcing material attached to the web are disclosed. Such filter media are useful for a wide variety of applications. The polymeric web may be a fabric, a nonwoven fibrous web, or a filtering foam. The reinforcing material can be applied directly to the web to provide strengthening to the web, making it, for example, more resistant to crushing. The reinforced filter media of this disclosure are particularly suitable for preparing respirator masks, especially respirator masks that do not require additional reinforcement such as from a mesh or a scrim.

The reinforced filter media can be prepared by providing a polymeric web and depositing a reinforcing material on the polymeric web in the form of strands. The strands adhere to the polymeric web. By adhering, it is meant that essentially the entire length of the strand is in contact with the polymeric web and adheres to the polymeric web. In some embodiments, strips of precursor material are deposited on the polymeric web and subjected to post-processing to form strands.

As used herein, the term "filter media" refers to a polymeric material in the form of a web suitable for air filtration. The web may comprise a single layer of material or may comprise a multilayer construction. In multilayer constructions, some layers may serve purposes other than filtration, e.g. support, cushioning, etc.

As used herein, the term "strand" refers to a discrete, non-intersecting, continuous filament of reinforcing material. A strand may overlap with other strands but the strands are discrete.

As used herein, the term "strip" refers to a discrete, non-intersecting, continuous filament of material which upon being subjected to post-processing becomes a strand.

As used herein, the term "post-processing" as related to converting strips to strands, refers to any process by which the material in a strip becomes the reinforcing material of a strand. Examples of post-processing include, drying, thermal curing, radiation curing, and the like.

As used herein, the term "respirator" means a device that is worn by a person to filter air before the air enters the person's respiratory system.

As used herein, the term "flat-fold respirator" means a device that can be folded flat for storage, can be unfolded to a shape that fits over at least the nose and mouth of a person and is designed to remove one or more airborne contaminants when worn by such person.

As used herein, the term "cup-shaped" when used with respect to a respirator mask body means having a configuration that allows the mask body to be spaced from a wearer's face when worn.

As used herein, the term "molding" when used with respect to a web or layers of webs means to use heat and/or pressure to form the web(s) into a predetermined shape. "Molded web" means a structure that has been formed into a desired shape, such as a cup-shape, that is adapted to fit over the nose and mouth of a person.

As used herein, the term "molded respirator" means a device that has been molded to a shape that fits over at least the nose and mouth of a person and that is designed to remove one or more airborne contaminants when worn by a person.

As used herein, the term "filtering foam" means a foam material that has an open cell or semi-open cell configuration and is suitable for use in a filter media construction either as a filter media or as a supplemental layer.

The reinforced filter media of this disclosure comprise a polymeric web reinforced with strands of a reinforcing material. The polymeric web to which the strands of reinforcing material is attached may be a single layer polymeric web or a multiple layer polymeric web. The polymeric web may be the filter media or may be a layer that is a component of a filter media. The reinforcing material is attached to the polymeric web. By attached it is meant that essentially the entire strand is in contact with and adhered to the polymeric web.

The polymeric web may be any suitable polymeric web useful in the preparation of filter media. Examples of suitable polymeric webs are fabrics, fibrous webs, and filtering foams. Examples of suitable filtering foams include, for example open cell and semi-open cell foam constructions. The filtering foams may be prepared from either thermoplastic or thermoset materials, such as, for example, polyurethanes, polyvinyl polymers (e.g. polyvinyl chloride polymers), and the like. Examples of fibrous polymeric webs include microfiber webs, fibrillated film webs, woven or nonwoven webs (e.g., airlaid or carded staple fibers), solution-blown fiber webs, or combinations thereof. Materials useful for forming such webs include, for example, polyolefins such as polypropylene, polyethylene, polybutylene, poly(4-methyl-1-pentene) and blends thereof, halogen substituted polyolefins such as those containing one or more chloroethylene units, or tetrafluoroethylene units, and which may also contain acrylonitrile units, polyesters, polycarbonates, polyurethanes, rosin-wool, glass, cellulose or combinations thereof.

Non-woven fibrous polymeric webs are especially useful as filter media. In some embodiments, the web is a non-woven microfibrous web. Typically microfibers are 1-100 micrometers, or more typically 3-30 micrometers in average diameter and the microfibers need not have a circular cross-section. Examples of suitable non-woven microfibrous webs include melt-blown microfiber webs and nanofiber laminates.

Melt-blown microfiber webs useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Useful melt-blown microfibers for fibrous electret filters typically have an effective fiber diameter of from about 3 to 30 micrometers, in some embodiments, from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser), U.S. Pat. No. 6,827,764 (Springett), and US Patent Application No. 2008/0318014 (Angadjivand).

Bicomponent staple fibers may also be used in the filtering layer or in one or more other layers of the filter media. The bicomponent staple fibers which generally have an outer layer which has a lower melting point than the core portion can be used to form a resilient shaping layer bonded together at fiber intersection points, e.g., by heating the layer so that the outer layer of the bicomponent fibers flows into contact with adjacent fibers that are either bicomponent or other staple fibers. The shaping layer can also be prepared with binder fibers of a heat-flowable polyester included together with staple fibers and upon heating of the shaping layer the binder fibers melt and flow to a fiber intersection point where they surround the fiber intersection point. Upon cooling, bonds develop at the intersection points of the fibers and hold the fiber mass in the desired shape. Also, binder materials such as acrylic latex or powdered heat activatable adhesive resins can be applied to the webs to provide bonding of the fibers.

Electrically charged fibers, called electrets, may also be used. Examples of such electret fibers are disclosed in U.S. Pat. No. 4,215,682 (Kubik et al.), U.S. Pat. No. 4,588,537 (Klasse et al.). Other methods of polarizing or charging electrets, e.g., by the process of U.S. Pat. No. 4,375,718 (Wadsworth et al.), or U.S. Pat. No. 4,592,815 (Nakao), may also be useful in the present disclosure. Electrically charged fibrillated-film fibers as taught in U.S. Pat. No. RE. 31,285 (van Turnhout), are also useful. In general the charging process involves subjecting the material to corona discharge, pulsed high voltage, or impingement by water (hydrocharging) as described in U.S. Pat. No. 5,496,507 (Angadjivand).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

The polymeric web may be in a variety of thicknesses from about 0.1 millimeter to 30 millimeters or even from about 0.5 millimeter to 10 millimeters.

The reinforcing strands comprise discrete non-intersecting continuous filaments of reinforcing material which is adhered to a polymeric web. In some embodiments, the web is a filter media web, but other polymeric webs that are incorporated into a multilayer construction that includes a filter media web may be used. Typically the reinforcing strands are formed either by directly depositing the reinforcing material onto the polymeric web or by depositing strips of a precursor material onto the polymeric web and subjecting the strips to post-processing to generate strands of reinforcing material.

The reinforcing strands are generally either a thermoplastic or a thermoset material. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Thermoset materials, however, are curable materials that irreversibly cure, such as becoming crosslinked, when heated or cured. Once cured, the thermoset material will not appreciably melt or flow upon application of heat.

Generally, the materials that are directly applied to the polymeric web to form strands are thermoplastic materials, blends of thermoplastic materials or mixtures of thermoplastic materials. In this way the strands may comprise a single material, a blend of materials or multi-component materials such as bi-component core-sheath materials in which one material or blend of materials form the core and a different material or blend of materials forms a sheath around the core.

Examples of thermoplastic polymers which can be used to form the strands of this disclosure may be selected from the following classes: polyolefins, such as polyethylenes, polypropylenes, polybutylenes, blends of two or more of such polyolefins, and copolymers of ethylene and/or propylene with one another and/or with small amounts of copolymerizable, higher, alpha olefins, such as pentene, methylpentene, hexene, or octene; halogenated polyolefins, such as chlorinated polyethylene, poly(vinylidene fluoride), poly(vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylene adipamide), e.g., nylon 6 and nylon 6,6, nylon elastomers such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth)acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid-grafted homo- or co-polymers of olefins and blends of two or more of such polymers, such as blends of polyethylene and poly(methyl acrylate), blends of ethylene-vinyl acetate copolymer and ethylene-methyl acrylate; blends of polyethylene and/or polypropylene with poly(vinyl acetate); and thermoplastic elastomer block copolymers of styrene of the A-B or A-B-A type, where A represents a thermoplastic polystyrene block and B represents a rubbery block of polyisoprene, polybutadiene, or poly(ethylene/butylene), examples include linear, radial, star and tapered styrene-isoprene block copolymers, linear styrene-(ethylene-butylene) block copolymers, and linear, radial, and star styrene-butadiene block copolymers. The foregoing polymers are normally solid, generally high molecular weight, and melt-extrudable such that they can be heated to form molten viscous liquids which can be pumped as streams to an extrusion die assembly and readily extruded therefrom under pressure as strands.

Numerous examples of suitable polymers are commercially available, too many to give an exhaustive list, but some examples of useful commercially available polymers useful include: those sold as "ELVAX" ethylene-vinyl acetate copolymers, such as ELVAX 40W, 4320, 250, and 350; those sold as "EMAC" ethylene-methyl acrylate copolymers, such as EMAC DS-1274, DS-1176, DS-1278-70, SP 2220 and SP-2260; those sold as "VISTA FLEX" thermoplastic elastomers, such as VISTA FLEX 641 and 671; those sold as "PRIMACOR" ethylene-acrylic acid copolymers, such as PRIMACOR 3330, 3440, 3460, and 5980; those sold as "FUSABOND" maleic anhydride-polyolefin copolymers, such as FUSABOND MB-110D and MZ-203D; those sold as "HIMONT" ethylene-propylene copolymers, such as HIMONT KS-057, KS-075, and KS-051P; those sold as "FINA" polypropylenes, such as FINA 3860X; those sold as "ESCORENE" polypropylenes, such as ESCORENE 3445; the polymer sold as "VESTOPLAST 750" ethylene-propylene-butene copolymer; those sold as "SURLYN" ionomers, such as SURLYN 9970 and 1702; those sold as "ULTRAMID" polyamides, such as ULTRAMID B3 nylon 6 and ULTRAMID A3 nylon 6,6; those sold as "ZYTEL" polyamides, such as ZYTEL FE3677 nylon 6,6; those sold as "RILSAN" polyamide elastomers, such as BMNO P40, BESNO P40 and BESNO P20 nylon 11; those sold as "PEBAX" polyether block polyamide elastomers, such as PEBAX 2533, 3533, 4033, 5562 and 7033; those sold as "HYTREL" polyester elastomers, such as HYTREL 3078, 4056 and 5526; those sold as "KRATON" and "EUROPRENE SOL TE" styrene block copolymers, such as KRATON D1107P, G1657, G1750X, and D1118X and EUROPRENE SOL TE 9110, and 6205.

As mentioned above, blends of two or more materials may also be used, either as the strand, or as either or both of the core or sheath material in a core-sheath strand. Some blends that have been found to be particularly desirable to form filaments, such as multi-component filaments like core-sheath filaments, are described in U.S. Pat. No. 5,811,186 (Martin et al.) which also includes descriptions of methods for forming multi-component filaments, like core-sheath filaments. Examples of such blends include: a blend of 85 to 15 wt % poly(ethylene-vinyl acetate), such as "ELVAX" copolymer, with 15 to 85 wt % poly(ethylene-acrylic acid), such as "PRIMACOR" polymer, the poly(ethylene-vinyl acetate) component of the blend generally will have a weight average molecular weight, $M_w$, of 50,000 to 220,000 and will have 5 to 45 mol % of its interpolymerized units derived from the vinyl acetate comonomer and the balance of units from ethylene, the poly(ethylene-acrylic acid) component of the blend generally will have a $M_w$ of 50,000 to 400,000 and have 1 to 10 mol % of its interpolymerized units derived from acrylic acid and the balance from ethylene; a blend of 20 to 70 wt % poly(ethylene-propylene-butene) terpolymer having $M_w$ of 40,000 to 150,000 and derived from equally large amounts of butene and propylene and a small amount of ethylene, such as "VESTOPLAST 750" polymer, with 80 to 30 wt % isotactic polypropylene; a blend that contains from 15 to 85 wt % poly(ethylene-vinyl acetate) and 85 to 15 wt % poly(ethylene-methyl acrylate), such as "EMAC" polymer, the poly(ethylene-vinyl acetate) component of this blend can have a molecular weight and composition like that described above, the poly(methyl acrylate) component can have a $M_w$ of 50,000 to 200,000 and 4 to 40 mol % of its interpolymerized units derived from the methyl acrylate comonomer.

In embodiments where the reinforcing strands are deposited directly on the polymeric web, the depositing may be achieved, for example, by using extrusion techniques to extrude strands directly onto the polymeric web. In some embodiments, it may also be desirable to aid the adhesion of the strands to the web by applying pressure, typically before the extruded strands have completely cooled.

A wide variety of extrusion techniques may be used to prepare the reinforcing strands. Particularly useful are techniques involving multiple dies extruding continuous strands onto a moving web such as described for example in US Patent Publication 2004/0143942 (Seth). Such techniques permit multiple options to control the dimensions of the extruded strands. For example, the dimensions of the strands may be easily varied by changing the pressure of the extruder (by changing the extruder screw speed or type), by changing the speed at which the web is moving (slowing down the web speed will generally produce wider extruded strands, while speeding up the web speed will generally produce narrower extruded strands), by changing the dimensions of the spaced die openings, etc. Additionally, neighboring strands may not be uniform, i.e. neighboring strands may be different in size or in shape. Similarly, by control of the extruder and/or control of the moving web, strands can be extruded which are in patterns such as lines, waves, zigzags, curlicues, and the like or the strands can have different thicknesses or different patterns at different points on the web.

An apparatus and method suitable for preparing a reinforced filter media of the present disclosure is shown in FIG. 1. In FIG. 1, coating apparatus 100 is used to prepared reinforced filter media 200. Polymeric web 110 enters the apparatus, has strands of reinforcing material extruded onto it and leaves the apparatus as reinforced filter media 200. Apparatus 100 comprises generally cylindrical rollers 120, 121, and 140 and nip roller 142. Rollers 120, 121, and 140 may be heated or cooled rollers as desired. In some embodiments, rollers 121 and 140 are both heated rollers and in other embodiments, roller 121 is a heated roller and 140 is a cooled roller. In still other embodiments, none of the rollers are heated or cooled.

The apparatus 100 depicted in FIG. 1 also includes an extruder 130 operable to feed a user-selectable strand die 132. The strand die 132 may include spaced openings (not shown) for extruding strand material to form numerous, elongate molten strands 214 of material extending in a generally parallel, spaced-apart relationship. The spaced openings may be the same or different. If different, the spaced openings generate a plurality of strands with different thickness, shape, pattern or a combination of different thickness, shape or pattern. The strand die 132 may be positioned in a variety of different ways, such that the molten strands of material 214 are extruded onto polymeric web 110 while it is on roller 120, onto roller 140 and then transferred to the polymeric web 110, or at point intermediate between these 2 positions.

The dimensions of the strands may be easily varied by changing the pressure in the extruder 130 (e.g., by changing the extruder screw speed or type); changing the speed at which the polymeric web 110, is moved (i.e., for a given rate of output from the extruder 130, increasing the speed at which the web 110 is moved will decrease the diameter of the strands, whereas decreasing the speed at which the web 110 is moved will increase the diameter of the strands); changing the dimensions of the spaced die openings, etc.

The strand die 132 may be easily interchangeable such that strands 214 of different configurations, e.g., different diameters and different spacing, can be formed. Selectively adjustable spacing and/or diameters for the openings along the length of the strand die 132 may, for example, allow change in strand thickness at various locations across the polymeric web 110. The strand die 132 may also be selected to form strands of other configurations, e.g., hollow strands, strands with shapes other than round (e.g., square, rectangular, oval, triangular, star, "+" shaped, etc.), or bi-component strands, such as core-sheath strands.

In some embodiments, the reinforcing strands are prepared by depositing strips of precursor material onto the polymeric web and subjecting the strips to post-processing to convert the strips into strands of reinforcing material. The depositing of strips may be carried out, for example, by a variety of coating techniques including printing, die coating, knife coating, and the like. Examples of printing techniques include, for example, screen printing (including rotary), gravure printing, thermographic printing, flexographic printing, intaglio printing, and inkjet printing.

Typically the precursor materials are thermoset materials, although it may be possible to use, for example, solutions of thermoplastic polymers. The precursor materials may be made from monomers, oligomers, or polymers, or mixtures thereof and may be 100% solids or solvent based or aqueous based solutions or mixtures. Generally, the precursor material is a liquid at room temperature. For some processes, the liquid is a viscous composition. The precursor material may also be a thermally softenable or liquefiable composition that may be deposited while heated to a sufficient temperature.

In some embodiments, a liquid carrier may be used as part of the precursor material as long as the precursor material structure does not flow too much prior to post-drying of the material. The liquid carrier may be organic or aqueous, and in some embodiments, it is a solvent.

In some embodiments, the precursor material is a chemically curable material, which may be post processed by, for example, polymerization, cross-linking, or both after it is deposited to make a robust final structure. Specific examples include curable inks, curable (meth)acrylates, (meth)acrylate functional materials, curable vinyl ethers, curable unsaturated materials, epoxide functional materials and curable silicones.

The reinforcing strands, however formed, comprise discrete non-intersecting continuous filaments of reinforcing material which is adhered to a polymeric web. The strands may take a variety of shapes. The strands may be in the form of straight lines, wavy lines, curlicues, or more intricate shapes. The strands, while continuous, may not have uniform thickness or shape along the entire strand. For example, the strands may be thicker or thinner at different points along the length of the strand, and may be straight lines at certain points and wavy lines at other points on the web. Additionally, neighboring strands may be the same or they may be different in size, shape or pattern.

The strands may be in a variety of thicknesses from about 0.1 millimeter to 10 millimeters, from about 0.1 millimeter to 2 millimeters or even from about 0.2 millimeter to 1 millimeter.

Generally the strand material or precursor material is applied directly to the web material, but in some instances it may be desirable to subject the web material to a treatment prior to the application of the strand material or strand precursor material. Such pretreatments may include physically treating the web such as applying heat, radiation, plasma discharges, and the like to alter the surface of the web. Additionally, the pretreatment may involve the application of a coating or coatings to the web. These coatings may enhance the adhesion of the strand material to the web.

An example of a suitable coating is the application of a tacky material, such as an adhesive, to help adhere the strand material to the web.

As stated above, the reinforcing strands are attached to a polymeric web. The polymeric web may be the filter media or the polymeric web may be an alternative polymeric web that is either part of a multilayer filter media or is later combined with additional layers to form the filter media.

Reinforced filter media can be used in a variety of applications such as, for example, as an air filter element of a respirator, such as a filtering facepiece respirator, or for such purposes as home and industrial furnaces and air-conditioners, air cleaners, vacuum cleaners, medical air line filters, and air conditioning systems for vehicles and common equipment, such as computers, computer disk drives and electronic equipment. In respirator uses, the filter media may be in the form of molded or folded half-face respirators, replaceable cartridges or canisters, or prefilters.

Figure 2:
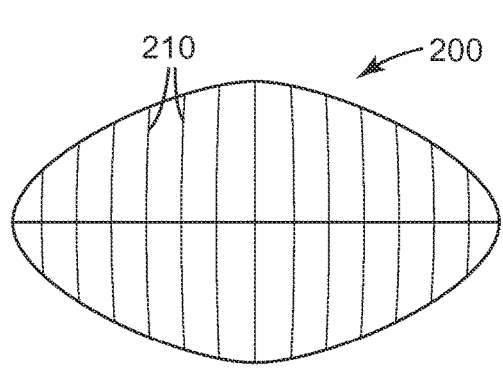
FIG. 2 is a perspective view of a flat-fold respirator embodiment of the present disclosure.
Figure 3:
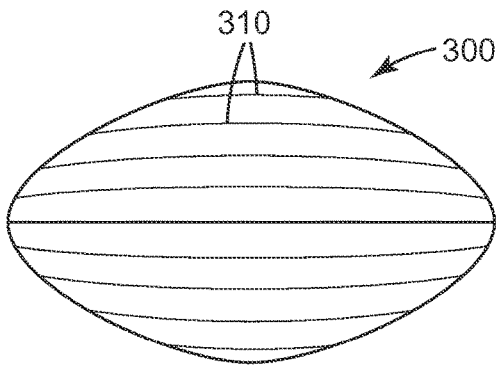
FIG. 3 is a perspective view of a flat-fold respirator embodiment of the present disclosure.
Figure 4:
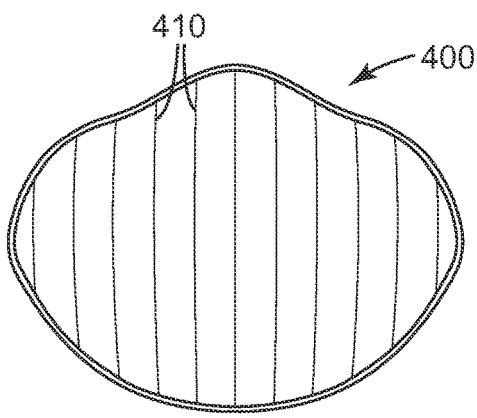
FIG. 4 is a perspective view of a cup-shaped respirator embodiment of the present disclosure.
Figure 5:
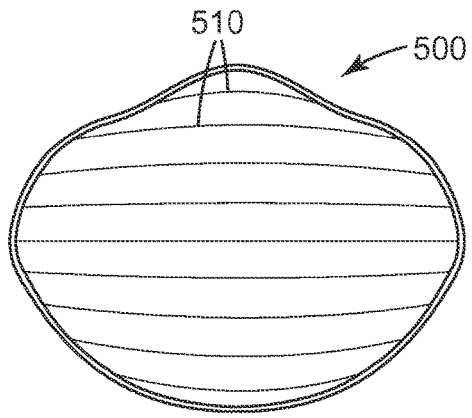
FIG. 5 is a perspective view of a cup-shaped respirator embodiment of the present disclosure.

FIGS. 2 and 3 depict examples of strand-reinforced flat-fold respirators and FIGS. 4 and 5 depict examples of strand-reinforced cup-shaped respirators. In FIG. 2, flat-fold respirator 200 contains strands of reinforcing material 210. The strands 210 run along the width of the respirator. In FIG. 3, flat-fold respirator 300 contains strands of reinforcing material 310. The strands 310 run along the length of the respirator. In FIG. 4, cup-shaped respirator 400 contains strands of reinforcing material 410. The strands 410 run along the width of the respirator. In FIG. 5, cup-shaped respirator 500 contains strands of reinforcing material 510. The strands 510 run along the length of the respirator.

The reinforced filter media of this disclosure are particularly useful in filtration respirators. Filtration respirators or face masks are used in a wide variety of applications when it is desired to help protect a human's respiratory system from particles suspended in the air or from unpleasant or noxious gases. Generally, such respirators or face masks are of one of two types: a molded cup-shaped form or a flat-folded form. The flat-folded form has advantages in that it can be carried in a wearer's pocket until needed and re-folded flat to keep the inside clean between wearings.

The flat-folded form of face mask may have a variety of shapes and may be designed to fold in a variety of ways. Examples of different types of flat-folded face masks are described, for example, in U.S. Pat. No. 6,394,090 (Chen et al.), and U.S. Pat. No. 6,123,077 (Bostock et al.).

Examples of commercially available flat-folded forms of face masks are ones that have been constructed as a fabric which is rectangular in form and have pleats running generally parallel to the mouth of the wearer. Such constructions often have a stiffening element to hold the face mask away from contact with the wearer's face. These commercially available flat-fold respirators typically use a stiffening member (e.g., a resilient supporting framework or other supporting element, see, for example, U.S. Pat. No. 4,300,549 to Parker) or a stiffening layer (e.g., a high basis weight nonwoven web that contains large diameter, high modulus fibers such as polyester fibers, see, for example, U.S. Pat. No. 6,123,077 to Bostock et al.) to impart greater structural stability to the unfolded respirator. The stiffening member or stiffening layer can help the respirator resist deflection during breathing cycles to discourage or prevent the wearer's lips and nostrils from contacting the respirator inner surface. Stiffening has sometimes also been provided by fusing a pleat across the width of the face mask in a laminated structure or by providing a seam across the width of the face mask. The reinforced filter media of this disclosure may be used without the requirement of a stiffening element, fused pleat or seam. This allows for more facile production of flat-fold respirators.

Flat-fold respirators of this disclosure may be a single layer construction or a multilayer construction. In multilayer constructions, one or more of the layers may be reinforced by strands of polymeric material. In some embodiments, the flat-fold respirator comprises a single layer of filter media. In other embodiments, the layer of filter media may be protected by one or more cover layers. In still other embodiments, the flat-fold respirator comprises additional layers besides the filer media and cover layers. Flat-fold respirators may be prepared using techniques described, for example, in U.S. Pat. No. 6,394,090 (Chen et al.) except that there is no need for a separate stiffening layer. A flat-fold respirator may be formed from a single layer or from multiple layers that can be attached to one another using various techniques such as a batch process (e.g., by plunge welding) or a continuous process (e.g., rotary welding). In either process, a flat-fold respirator is produced by forming a substantially flat sheet of a single filter media layer or a multilayer construction (also referred to herein as a "preform") by bonding and cutting the outer forming edges. Other techniques may be employed for forming the edges utilizing other techniques, such as ultrasonic welding, stitching, and the application of pressure to form the edges (with or without the addition of heat). A substantially flat preform can have any shape. In some embodiments, the substantially flat preform has a diamond shape, although other shapes (e.g., pentagonal, hexagonal, semicircular, square, butterfly, etc.) are equally suitable. Typically the process for forming the flat-fold respirator includes forming at least one line of demarcation within the preform; folding the preform along a substantially bisecting axis; and forming a first angle and a second angle.

More complex configurations which have been disclosed include a cup-shaped filtering facepiece made from a pocket of filtering sheet material having opposed side walls, a generally tapering shape with an open end at the larger end and a closed end at the smaller end. The edge of the pocket at the closed end is outwardly bowed, e.g. defined by intersecting straight lines and/or curved lines, and the closed end is provided with fold lines defining a surface which is folded inwardly of the closed end of the pocket to define a generally conical inwardly extending recess for rigidifying the pocket against collapse against the face of the wearer on inhalation.

Molded respirators of this disclosure may be a single layer construction or a multilayer construction. In multilayer constructions one or more of the layers may be reinforced by strands of polymeric material. In some embodiments, the molded respirator comprises a single layer of filter media. In other embodiments, the layer of filter media may be protected by one or more cover layers. In still other embodiments, the molded respirator comprises additional layers besides the filter media and cover layers. To form the molded respirator, the filter media or the stack of filtration layer(s) and cover layer(s) is placed into a molding apparatus that has cup-shaped male and female molding surfaces. The molding surfaces are typically heated. The molding surfaces are then brought together for sufficient time and/or at sufficient pressure so as to form the filter media or multilayer stack into a cup-shaped mask body (which typically has a convex and a concave side). Excess material can then be cut from around the molded piece, after which straps, harnesses, valves, etc., can be added as desired to form the finished respirator. The molding process typically imparts some degree of permanent shaping to the filter media layer along with optional additional layers. The molding process may also impart some amount of melt-bonding between the various individual fibers at the points of contact between the fibers, and may also impart some amount of melt-bonding of the various layers to each other. If sufficient bonding between the various layers is not performed in the molding process, additional methods can be used. For example, a bonding process (such as ultrasonic welding) can be performed around the edges of the respirator, or mechanical clamps or other bonding means may be used around edges, to ensure that the layers are held together adequately. If this is not sufficient, localized bonding treatments (e.g. spot welding, etc.) can be used in appropriate locations on the respirator, as long as the properties of the respirator are not unduly affected. It is also possible to use adhesive layers to bond the various layers together, as described in U.S. Pat. No. 6,923,182 (Angadjivand et al.).

In some embodiments, it may be desirable to form a polymeric web with attached reinforcing strands that is not itself a filter media. This reinforced polymeric web can be combined with one or more additional layers of material, including a filter media layer, which can then be formed into either a flat-fold or cup-shaped respirator mask. Examples of such polymeric webs include, for example, carrier webs, cover webs, cushioning webs, supporting webs, and the like. In this way, a reinforced polymeric web can be formed separate from the filter media web and be combined to form a reinforced filter media.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

TABLE

Table of Abbreviations

| Abbreviation or Trade Designation | Description |
|---|---|
| Fiber-1 | Polyester (polyethylene terephthalate or PET) staple fiber 15 denier, 32 millimeter cut length, Type 295, commercially available from Invista Corp, Charlotte, NC. |
| Fiber-2 | Bicomponent fiber of 4 denier, 51 millimeter cut length, Type 254, commercially available from Invista Corp, Charlotte, NC. |
| PU-1 | Polyurethane polymer, an aromatic polyether TPU based alloy, commercially available as ESTANE T5515 NAT 021P from Lubrizol Advanced Materials Inc. Cleveland, OH. |
| PP-1 | Polypropylene polymer commercially available as FINA 3960, from Fina Oil and Chemical Co., Houston, TX. |
| CW-1 | Carrier web, nonwoven polyester spunbond carrier web, commercially available from PT Multi Spunindo Jaya, Jawa, Timur, Indonesia, with a basis weight of 30 grams/$m^2$. |
| FM-1 | Filter media, blown microfiber web made from polypropylene FINA 3960 (from Fina Oil and Chemical Co., Houston, TX), corona treated and hydrocharged as described in the U.S. Pat. No. 5,496,507 (Angadjivand et al.). |
| Coverweb-1 | Coverweb, 17 grams/$m^2$ polypropylene spunbond coverweb, commercially available from BBA Nonwovens. |
| Commercial Respirator-1 | Commercially available respirator, 3M Particulate Respirator 8210 from 3M Company, St. Paul, MN. |
| FM-2 | A microfiber, melt blown, non-woven web was produced and charged as described in Example 3 of US Patent Publication 20080011303, except that CHIMASSORB 944 hindered amine light stabilizer from Ciba Specialty Chemicals was used in the web at a concentration of 0.8 weight percent as an electret charging additive. The melt blown non-woven was produced with a 10 inch (25.4 cm) wide drilled orifice melt-blowing die whose original 0.012 inch (0.3 mm) orifices had been modified by drilling out every 9th orifice to 0.025 inch (0.6 mm), thereby providing a 9:1 ratio of the number of smaller size to larger size holes and a 2:1 ratio of larger hole diameter to smaller hole diameter. The microfiber melt-blown non-woven had a basis weight of approximately 100 grams/$m^2$, a solidity of approximately 6.5%, and an Effective Fiber Diameter of approximately 10.0 micrometers. The web was hydrocharged with de-ionized water. |
| Coverweb-2 | Coverweb, 50 grams/$m^2$ polypropylene spunbond coverweb, commercially available from BBA Nonwovens. |
| Commercial Respirator-2 | Commercially available respirator, 3M Particulate Respirator 9010 from 3M Company, St. Paul, MN. |
| Commercial Respirator-3 | Commercially available respirator, 3M Particulate Respirator 9002A from 3M Company, St. Paul, MN. |
| PE | Polyolefin Elastomer, commercially available as ENGAGE 8411, from The Dow Chemical Company, Midland, Michigan. |
| Blue Pigment | Color: Blue P.M.S. # 13P805CMB, Lot #598894 commercially available from PolyOne. |

Test Methods
Particulate Penetration with Sodium Chloride

The test method is the NIOSH 42CFR Part 84—N95 NaCl test. Percent penetration and pressure drop were determined using a challenge aerosol containing NaCl particles, delivered at a flow rate of 85 liters/min, and evaluated using a TSI Model 8130 high-speed Automated Filter Tester (commercially available from TSI Inc., St. Paul, Minn.). The particles were generated from a 2% NaCl solution to provide an aerosol containing particles with a diameter of about 0.075 micrometers at an airborne concentration of about 16-23 mg/m$^3$, and the Automated Filter Tester was operated with both the heater and particle neutralizer on. The samples were loaded to the maximum NaCl particle penetration at an 85 liters/min flow rate for molded matrices before halting the test. Calibrated photometers were employed at the filter inlet and outlet to measure the particle concentration and the % particle penetration through the filter.

Formed Shell Collapse Test

This test measures the rebound force of cup-shaped respirators. A Texture Analyzer Model TA-XT2 from Texture Technologies Corp, fitted with a test probe with a radius of 12 millimeters was used. The test was carried out in one cycle. The probe was placed above the cusp of the curved surface of the respirator. A force F was applied to the respirator specimen at a downward speed of 5 mm/min to a 30 mm deflection. When the desired maximum deflection was reached, the direction of the force (test probe) was reversed and the test probe was retracted back slowly at an upward speed of 5 mm/min. The slow crosshead speed during return enabled the rebounding force to be recorded precisely. During the test a Force vs Distance graph was plotted.

Flat-Fold Collapse Test

This test measures the collapse resistance of flat-fold respirators. The tester was a 2 section air tight chamber, separated by a plate that carries a collapse sensing device. The collapse sensing device had several Light Emitting Diodes (LEDs) and phototransistors. The collapse sensing device worked in this way: during testing, an electric signal was transmitted between the LED and phototransistors; when pressure built up in the top chamber and caused the respirator to collapse, the signal was interrupted indicating collapse. The test respirator was placed over the collapse sensing device and another plate with a lightweight flexible plastic sheeting in the middle was placed over the respirator. The plastic sheet ensured collapse of the respirator while preventing airflow through the respirator. A mass flow controller using a 21 kilopascals (30 psi) input of air pressure was used to slowly raise the pressure in the top chamber and maintain the flow rate at a constant level of from 0.5-50 liters/minute. When the collapse sensing device indicated collapse, the flow controller was automatically stopped. A differential pressure transducer was used to monitor the pressure difference between the pressurized top chamber and the unpressurized bottom chamber. When collapse was detected by the collapse sensing device, the pressure difference was recorded as the Collapse Pressure. Multiple runs were typically used to provide an Average Collapse Pressure.

Comparative Example C1

Figure 6:
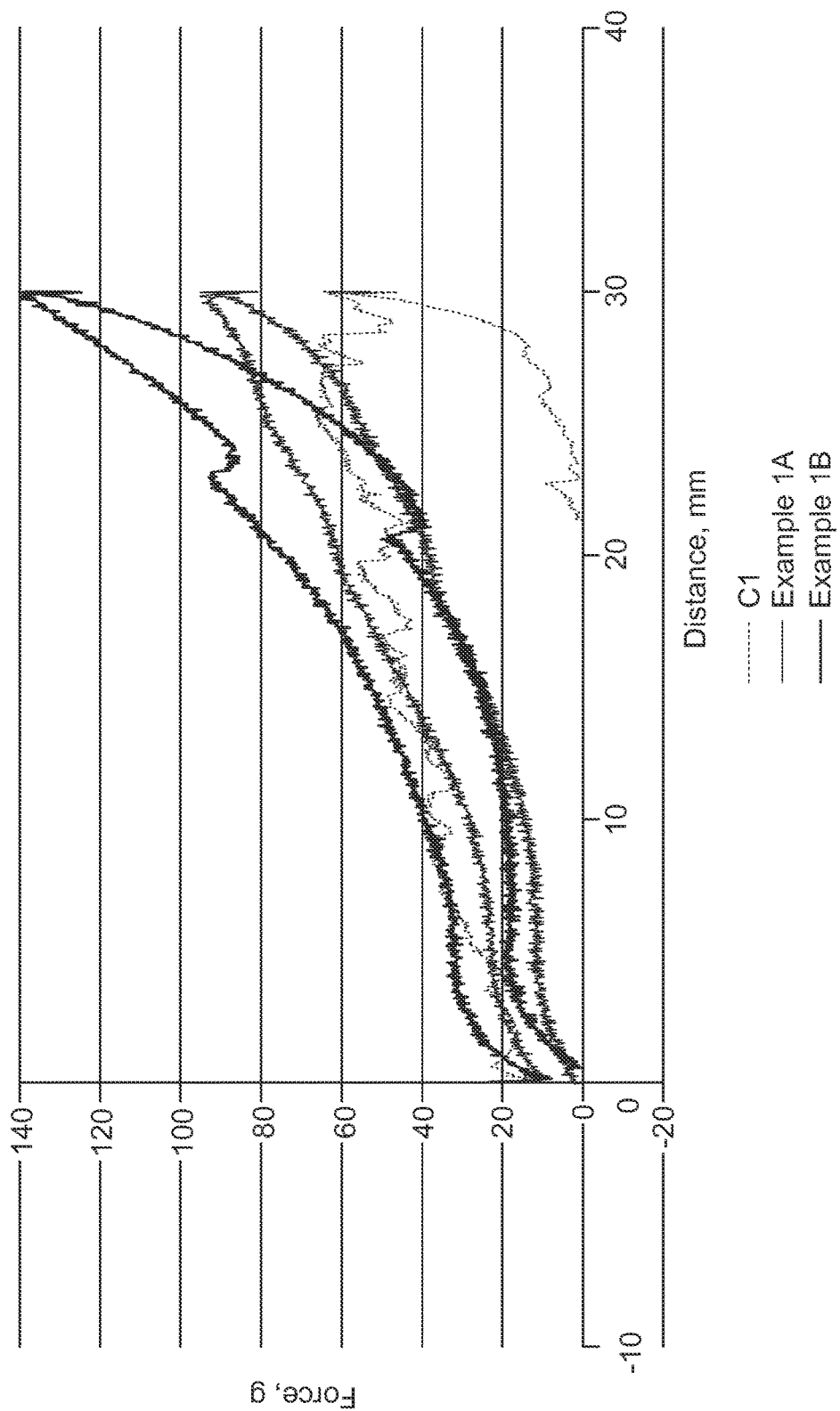
FIG. 6 is a graph of Formed Shell Collapse Test data for Example 1A and 1B and Comparative Example C1.

A non-woven molded shell web without reinforcing strands was prepared. The nonwoven shell web was a dry-laid web that has a basis weight of 106 grams/m$^2$, thickness of 8 millimeters and solidity of 1%. This nonwoven web was prepared from a blend of staple fibers that are thermally bonded together. The web was prepared by carded blends of Fiber 1 and Fiber 2, in a 70:30 Fiber-1/Fiber-2 fiber weight ratio and subsequently placing the carded web in a 163° C. circulating air oven for about 1 minute to activate the binder fibers and consolidate the web. Molding of the nonwoven shell layer to form a molded shell was done by placing the nonwoven web layer between two mating hemispherical cup-shaped heated molds that were about 55 millimeters in height and had a volume of about 310 cm$^3$. The top and bottom halves of the molds were heated to about 93° C. and 105° C. respectively. The heated molds were closed to a gap of approximately 1.27 millimeters for approximately 6 seconds. After this time, the molds were opened and the molded product was removed and trimmed manually. Ultrasonic bonding was then performed on the perimeter of the molded shell. The molded cup-shaped shell was evaluated for crush/resiliency resistance using the Formed Shell Collapse Test described in the Test Methods above. The test results are shown in FIG. 6.

Example 1

A non-woven molded shell web with reinforcing strands was prepared. The nonwoven shell web was a dry-laid web that has a basis weight of 106 grams/m$^3$, thickness of 8 millimeters and solidity of 1%. This nonwoven web was prepared from a blend of staple fibers that are thermally bonded together. The web was prepared by carded blends of Fiber-1 and Fiber-2, in a 70:30 Fiber-1/Fiber-2 fiber weight ratio and subsequently placing the carded web in a 163° C. circulating air oven for about 1 minute to activate the binder fibers and consolidate the web. In a 51 millimeter single screw extruder was place a mixture of PU-1 and PP-1 in a 65:35 weight ratio. The extruder was operated at 210° C. and 13 RPM and filaments were extruded from this extruder through 0.51, 0.64, and 0.79 mm orifices onto an upper smooth collection roll, 3 filaments per 1 centimeter of width, with a line speed of 5.0 meters per minute. The filaments thus formed were passed onto the web described above. The resulting nonwoven reinforcement shell web had a total basis weight of about 214 grams/m$^2$, of which about 110 grams/m$^2$ was the reinforcement strands. Molding of the nonwoven shell layer to form a molded shell was done by placing the nonwoven web layer between two mating hemispherical cup-shaped heated molds that were about 55 millimeters in height and had a volume of about 310 cm$^3$. The top and bottom halves of the molds were heated to about 93° C. and 105° C. respectively. The heated molds were closed to a gap of approximately 2.50 millimeters for approximately 6 seconds. After this time, the molds were opened and the molded product was removed and trimmed manually. Ultrasonic bonding was then performed on the perimeter of the molded shell. For Example 1A the molding was done in the machine direction (such that the strands pass over the cup in a direction that would be across the width of a wearer's face), for Example 1B the molding was done in the cross web direction (such that the strands pass over the cup in a direction that would be orthogonal to the width of a wearer's face). The molded cup-shaped shells were evaluated for crush/resiliency resistance using the Formed Shell Collapse Test described in the Test Methods above. The test results are shown in FIG. 6.

Example 2

Figure 7:
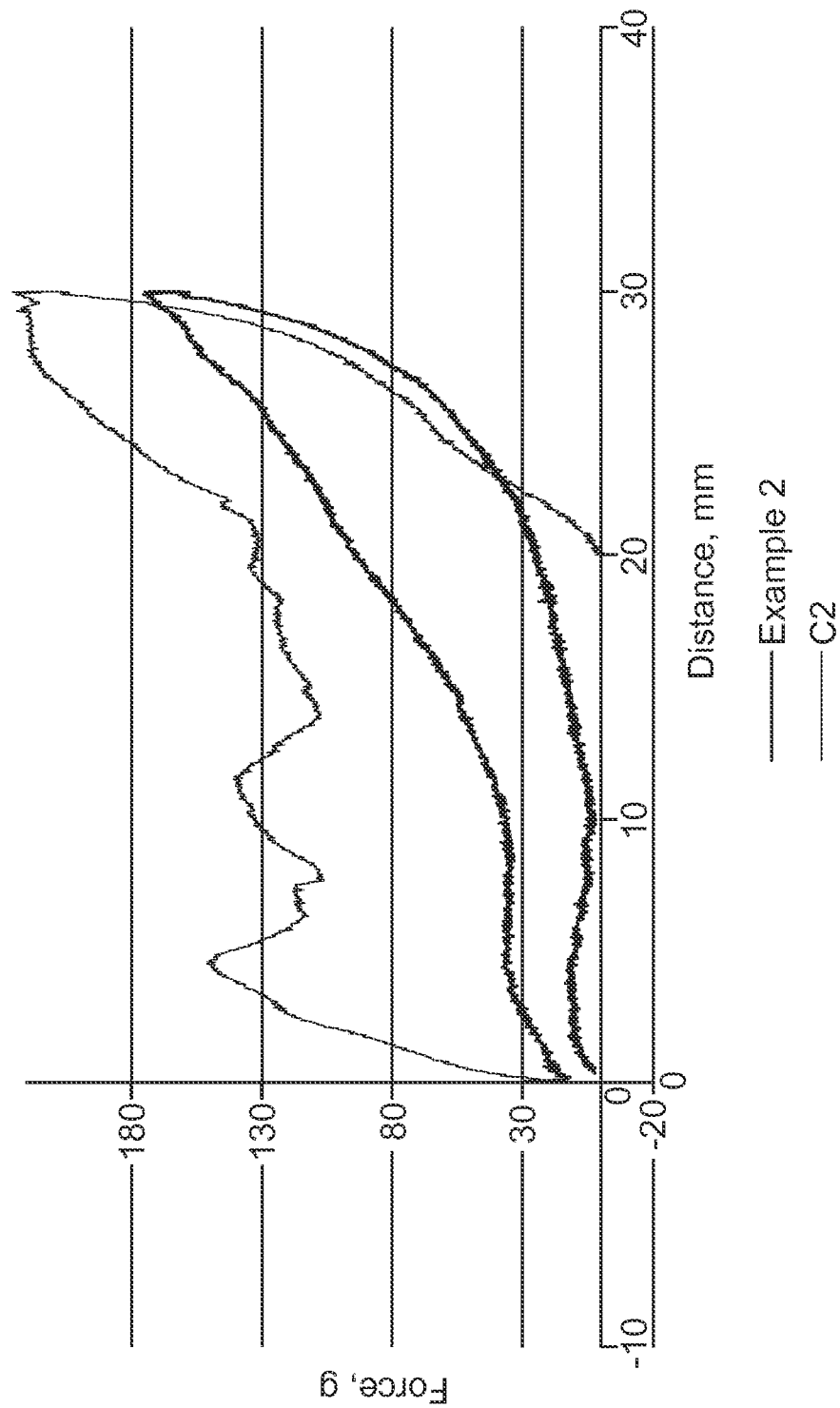
FIG. 7 is a graph of Formed Shell Collapse Test data for Example 2 and Comparative Example C2.

A non-woven molded shell web with reinforcing strands was prepared and used to prepare a respirator. A strand reinforced non-woven fiber web was prepared. In a 51 millimeter single screw extruder was place a mixture of PU-1 and PP-1 in a 65:35 weight ratio. The extruder was operated at 210° C. and 13 RPM and filaments were extruded from this extruder through 0.64 and 0.79 mm orifices onto a CW-1 web, 3 filaments per 1 centimeter of web width, with a line speed of 5.0 meters per minute. The resulting nonwoven reinforcement shell web had a total basis weight of about 150 grams/m$^2$, of which about 120 grams/m$^2$ was the reinforcement strands. Samples of FM-1 and Coverweb-1 were laminated to the reinforced web and the formed construction was molded together to make a finished respirator. The respirator was molded such that the reinforced layer was toward the convex side of the respirator and the Coverweb-1 layer was on the concave side of the respirator with the FM-1 sandwiched between the reinforced layer and coverweb. The filter web had a basis weight of 35 grams/m$^2$, and a fiber size of 4.7 micrometers. Molding of the layered web was done by pressing the assembled layers between mating female and male molds. The female mold had a height of about 55 mm and had a volume of 310 cm$^3$. The top and bottom half of the mold were heated to about 105° C., and the webs were placed between the mold halves. The heated mold was then closed at a gap of 1.27 millimeters, for approximately 10 to 15 seconds. After the specified time, the mold was opened and the molded product was removed. The molded cup-shaped respirator was evaluated for crush/resiliency resistance using the Formed Shell Collapse Test described in the Test Methods above. The test results are shown in FIG. 7.

Comparative Example C2

For Comparative Example C2, commercially available respirator Commercial Respirator-1 was used. The molded cup-shaped respirator was evaluated for crush/resiliency resistance using the Formed Shell Collapse Test described in the Test Methods above. The test results are shown in FIG. 7.

Example 3

A non-woven filter material web with reinforcing strands was prepared and used to prepare a respirator. A strand reinforced non-woven filter media web was prepared. In a 51 millimeter single screw extruder was place a mixture of PU-1 and PP-1 in a 65:35 weight ratio. The extruder was operated at 210° C. and 13 RPM and filaments were extruded from this extruder through 0.51 and 0.79 mm orifices onto an upper smooth collection roll, 3 filaments per 1 centimeter of width, with a line speed of 5.0 meters per minute. The filaments thus formed were passed onto a web of FM-2. The fibers had a diameter of 1.0-1.5 millimeters and a basis weight of 70 grams/m$^2$. The resulting nonwoven reinforcement shell web had a total basis weight of about 170 grams/m$^2$, of which about 70 grams/m$^2$ was the reinforcement strands. A sample of Coverweb-1 was laminated to the reinforced FM-2 web and the formed construction was molded together to make a finished respirator. Molding of the layered web was done by pressing the assembled layers between mating female and male molds. The top half of the mold was heated to about 79° C. (175° F.) and the bottom half of the mold was heated to about 116° C. (240° F.), and the webs were placed between the mold halves. The heated mold was then closed at a gap of 0.51 millimeters (0.020 inches), for approximately 9 seconds. After the specified time, the mold was opened and the molded product was removed. The molded cup-shaped respirator was evaluated using the Particulate Penetration with Sodium Chloride Test described in the Test Methods above. The test results are shown in Table 1.

Example 4

A non-woven filter material web with reinforcing strands was prepared and used to prepare a respirator. A strand reinforced non-woven filter media web was prepared. In a 51 millimeter single screw extruder was place a mixture of PU-1 and PP-1 in a 65:35 weight ratio. The extruder was operated at 210° C. and 13 RPM and filaments were extruded from this extruder through 0.51 and 0.79 mm orifices onto an upper smooth collection roll, 3 filaments per 1 centimeter of width, with a line speed of 5.0 meters per minute. The filaments thus formed were passed onto a web of FM-2. The web had a basis weight of 100 grams/m$^2$. The resulting nonwoven reinforcement shell web had a total basis weight of about 200 grams/m$^2$, of which about 100 grams/m$^2$ was the reinforcement strands. A sample of Coverweb-1 was laminated to the reinforced FM-2 web and the formed construction was molded together to make a finished respirator. Molding of the layered web was done by pressing the assembled layers between mating female and male molds. The top half of the mold was heated to about 79° C. (175° F.) and the bottom half of the mold was heated to about 116° C. (240° F.), and the webs were placed between the mold halves. The heated mold was then closed at a gap of 0.51 millimeters (0.020 inches), for approximately 9 seconds. After the specified time, the mold was opened and the molded product was removed. The molded cup-shaped respirator was evaluated using the Particulate Penetration with Sodium Chloride Test described in the Test Methods above. The test results are shown in Table 1. The Examples pass the N95 specification for filter materials.

TABLE 1

| Example | Initial Pressure Drop (mm H$_2$O) | Initial Pen (%) | Maximum Pressure Drop (mm H$_2$O) | Maximum Pen (%) |
|---|---|---|---|---|
| 3 | 3.8 | 0.204 | 20.4 | 4.410 |
| 4 | 4.0 | 0.136 | 13.1 | 3.460 |

Example 5 and Comparative Examples C3 and C4

A non-woven web with reinforcing strands was prepared and used to prepare a flat-fold respirator. In a 51 millimeter single screw extruder was placed 99.5 weight % PE and 0.5 weight % Blue Pigment. The extruder was operated at 198° C. and 15 RPM and filaments were extruded from this extruder through 0.64, 0.64, and 0.79 millimeter orifices onto an upper smooth collection roll, 3 filaments per 1 centimeter of width, with a line speed of 5.0 meters per minute. The filaments thus formed were passed onto a web of Coverweb-2. The resulting nonwoven reinforcement web had a total basis weight of about 128 grams/m$^2$, of which about 78 grams/m$^2$ was the reinforcement strands. The reinforced nonwoven web thus prepared was laminated (in both directions, horizontally or what will be the length of the formed respirator, and vertically or what will be the width of the formed respirator) with a layer of FM-1 and Coverweb-2, and then cut and ultrasonically sealed together as described in U.S. Pat. No. 6,390,090, to form a flat-fold respirator. The Example 5A respirators have the reinforcing strands running vertically and the Example 5B respirators have the reinforcing strands running horizontally. The flat-fold respirators for Examples 5A and 5B as well as Comparative Examples C3 (Commercial Respirator-2 which contains a stiffener element) and C4 (Commercial Respirator-3 which does not contain a stiffener element) were evaluated for collapse resistance using the Flat-Fold Collapse Test described in the Test Methods above. The test results are shown in Table 2.

TABLE 2

| Example | Average Collapse Pressure (mm H$_2$0) |
|---|---|
| 5A | 73.7 |
| 5B | 60.5 |
| C3 | 62.2 |
| C4 | 27.9 |

What is claimed is:

1. A respirator comprising:
    a reinforced filter media, the reinforced filter media comprising:
        a polymeric web; and
        discrete, non-intersecting strands of a thermoset polymeric reinforcing material attached to the web,
        wherein at least one strand runs along at least one of substantially a full maximum width of the respirator or substantially a full maximum length of the respirator,
        wherein the discrete, non-intersecting strands of reinforcing material are in a generally parallel, spaced apart relationship and are not interconnected,
        wherein the at least one strand is bounded by at least one edge of the polymeric web.

2. The respirator of claim 1, wherein the polymeric web comprises a fabric, a nonwoven web, or a filtering foam.

3. The respirator of claim 1, wherein the reinforcing material comprises a polyolefin; a halogenated polyolefin; a copolyester-ether elastomer of cyclohexane dimethanol, tetramethylene glycol, and terephthalic acid; a copolyester elastomer; a polyether; a polyamide; a polyether block polyamide; a polyurethane; a copolymer of ethylene, or ethylene and propylene, with acrylics; an ionomer; an acrylonitrile polymer; an acrylic copolymer; a chemically-modified polyolefin; or a thermoplastic elastomer block copolymer; or blends or combinations thereof.

4. The respirator of claim 1, wherein the discrete, non-intersecting strands of reinforcing material comprises a core-sheath construction.

5. The respirator of claim 1, further comprising at least one additional web layer.

6. The respirator of claim 1, wherein the respirator is a flat-fold respirator.

7. The respirator of claim 1, wherein the respirator is a molded cup-shaped respirator.

* * * * *